(12) United States Patent  (10) Patent No.: US 8,328,025 B2
Schaller et al. (45) Date of Patent: *Dec. 11, 2012

(54) DUAL SURFACE DENSITY BAFFLE FOR CLARIFIER TANK

(76) Inventors: Earle Schaller, Palm Beach Gardens, FL (US); Elaine Schaller, Palm Beach Gardens, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/028,435

(22) Filed: Feb. 16, 2011

(65) Prior Publication Data

US 2012/0043276 A1 Feb. 23, 2012

Related U.S. Application Data

(63) Continuation of application No. 12/423,181, filed on Apr. 14, 2009, now Pat. No. 7,963,403.

(60) Provisional application No. 61/125,275, filed on Apr. 23, 2008, provisional application No. 61/206,039, filed on Jan. 26, 2009, provisional application No. 61/206,574, filed on Jan. 30, 2009, provisional application No. 61/196,405, filed on Oct. 15, 2008.

(51) Int. Cl.
*B01D 21/02* (2006.01)

(52) U.S. Cl. ............... 210/521; 210/528; 210/532.1; 210/539; 210/541; 220/660

(58) Field of Classification Search .......... 210/521, 210/525, 528, 532.1, 539, 541; 220/654, 220/660

See application file for complete search history.

(56) References Cited

U.S. PATENT DOCUMENTS

| | | | | |
|---|---|---|---|---|
| 5,252,205 A * | 10/1993 | Schaller | ........................ | 210/521 |
| 5,597,483 A * | 1/1997 | Schaller | ........................ | 210/541 |
| 7,416,662 B2 * | 8/2008 | Aditham et al. | ............. | 210/521 |
| 7,556,157 B2 * | 7/2009 | Schaller et al. | ............. | 210/521 |
| 7,722,776 B2 * | 5/2010 | Essemiani et al. | ............ | 210/521 |
| 7,726,494 B2 * | 6/2010 | Schaller et al. | ............. | 210/521 |
| 7,963,403 B2 * | 6/2011 | Schaller et al. | ............. | 210/521 |
| 7,971,731 B2 * | 7/2011 | Schaller | ........................ | 210/521 |
| 8,083,075 B2 * | 12/2011 | Schaller et al. | ............. | 210/521 |
| 2011/0233135 A1 * | 9/2011 | Schaller | ........................ | 210/521 |

* cited by examiner

*Primary Examiner* — Christopher Upton
(74) *Attorney, Agent, or Firm* — Sofer & Haroun, LLP

(57) ABSTRACT

A baffle system for use in a clarifier tank, having a tank bottom and a periphery and a substantially vertical peripheral wall bounding the interior of the tank, has a plurality of baffles mounted on the peripheral wall of the clarifier tank. each baffle has an upper baffle surface with a lower end and an upper end. The upper end of the upper baffle portion is coupled to the side wall of the clarifier tank wall. The lower end of the upper baffle portion is disposed. at a substantially 60° angle away from the side wall of the clarifier tank such that the upper baffle surface slopes downwardly and away from the side wall.

12 Claims, 7 Drawing Sheets

DUAL SURFACE DENSITY BAFFLE FOR CLARIFIER TANK

RELATED APPLICATION

This application is a continuation of U.S. patent application Ser. No. 12/423,181 filed on Apr. 14, 2009, now U.S. Pat. No. 7,963,403, which in turn claims the benefit of priority from U.S. Provisional Patent Application No. 61/125,275, field on Apr. 23, 2008; U.S. Provisional Patent Application No. 61/206,039, filed on Jan. 26, 2009; U.S. Provisional Patent Application No. 61/206,574, filed on Jan. 30, 2009, and U.S. Provisional Patent Application No. 61/196,405, filed on Oct. 15, 2008 the entirety of which are incorporated by reference.

BACKGROUND

1. Field of the Invention

This application relates to a baffle and baffle system for use in a solids-precipitating clarifier tank. More particularly, the application relates to a baffle and baffle system having a plurality of inter-engaged individual baffles secured to the clarifier lank peripheral wall.

2. Prior Art Discussion

Baffle devices, also known in the art as a lamella gravity separators or settlers, are used in clarifier tanks for waste treatment for gravitationally separating suspended solids from solids containing carrier liquid or fluid suspensions. The clarifier tanks, with which such baffles are typically used, are circular or rectangularly configured tanks in which a centrally mounted radially extending arm is slowly moved or rotated about the tank at or proximate the surface of the carrier liquid.

Specifically, in waste water treatment facilities utilizing secondary clarifiers, the clarifier's effectiveness in removing solids is perhaps the most important factor in establishing the final effluent quality of the facility.

A major deterrent to effective removal is the presence of sludge density currents which cause hydraulic short circuits within the tank. These short circuits, in turn, allow solids concentrations to unintentionally bypass the tank's clarification volume and enter the effluent. In the prior art, peripheral baffles are attached to the tank wall and directed downward at an angle into the tank. These baffles help to minimize the density currents and properly redirect the flow of solids away from the effluent and into the main clarification volume (center) of the tank.

However, although these density baffle systems work to significantly reduce solids from entering the effluent, under greater load conditions these baffle systems occasionally fail, allowing for the above described short circuits.

SUMMARY

The present arrangement overcomes the drawbacks associated with the prior art providing for a dual surface baffle, combining an inclined upper surface, similar to the prior art design, with a lower baffle surface that mirrors the first, inclined back toward the tank wall, forming a wedge-shaped dual surface baffle. Such an arrangement allows the lower portion to be retrofitted to any existing downwardly angled baffles, upgrading it to the presently described dual surface configuration. In one configuration, the upper and lower inclined surfaces of the baffle are set 30° degrees off from a line perpendicular to the tank wall (i.e. 60° degrees from the wall itself). Such a configuration results in a smaller tank wall footprint" and also allows the same amount of baffle construction material to reach further into the center of the clarifier tank.

According to this embodiment, the dual surface baffle reduces clarifier effluent solids to a far greater extent than prior art designs; improves functionality as in larger sized clarifiers: and improves effectiveness with increased effluent flow.

In one arrangement. the dual surface density current baffle reduces effluent solids (TSS—Total Suspended Solids) by as much as 80% over prior art designs. The dual surface baffle may be advantageously utilized in larger clarifiers (80 foot diameter and up) and those clarifiers that operate at higher effluent flows, including clarifiers in combined sewer configurations. Such a design redirects the density current, just above the blanket and then lifting upward as they near the tank wall, back toward the center of the tank.

BRIEF DESCRIPTION OF THE DRAWING

The present invention can be best understood through the following description and accompanying drawings, wherein.

DETAILED DESCRIPTION

Figure 1:
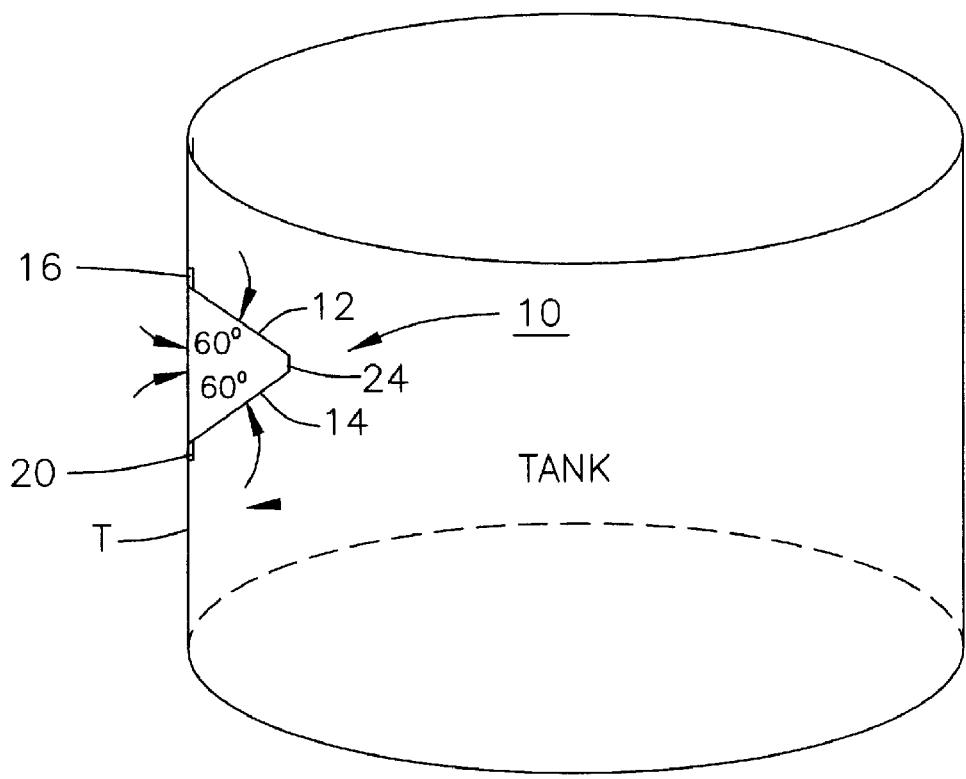
FIG. 1 shows a dual surface baffle as installed on a clarifier tank wall in accordance with one embodiment of the present invention.

In one arrangement. shown in FIG. 1, dual surface density current baffle 10 is shown attached to a tank wall T. Density baffle 10 is made from an upper baffle surface 12 and second lower baffle surface 14. Upper baffle surface 12 slopes downwardly away from wall T towards the center of the tank and lower baffle surface 14 is positioned below upper surface 12, sloping upwardly away from wall T towards the center of the tank. Upper and lower baffle surfaces 12 and 14 meet a central plane 24. parallel to wall T. Typically, central plane 24 is approximately 3 inches in length to provide a substantial connection surface between upper and lower surfaces 12 and 14, but it is not limited in this respect. Upper baffle surfaces 12 and lower baffle surfaces 14 are connected to tank wall T via upper and lower mounting flanges 16 and 20 respectively.

Figure 2:
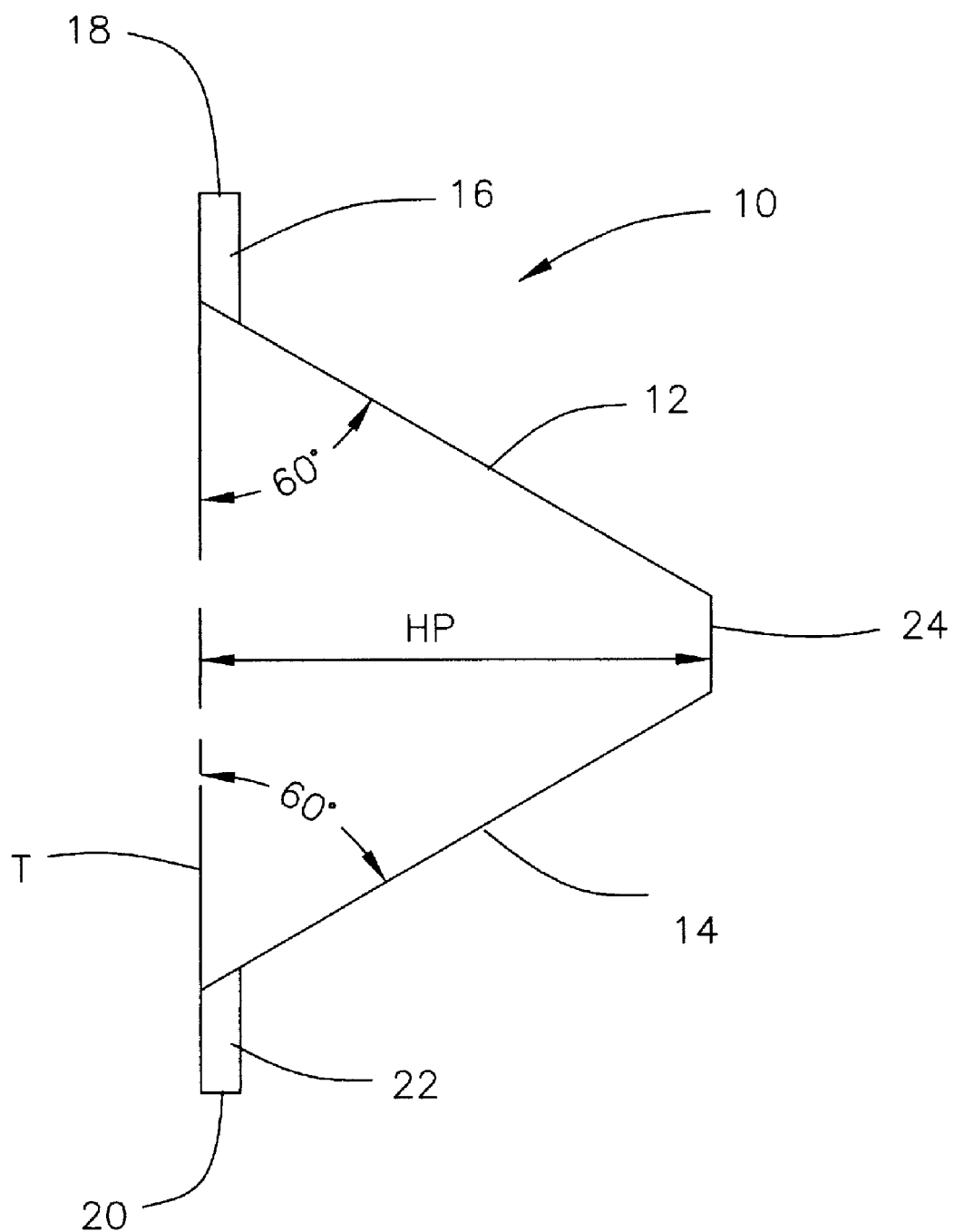
FIG. 2 shows a dual surface baffle in accordance with one embodiment of the present invention.
Figure 3:
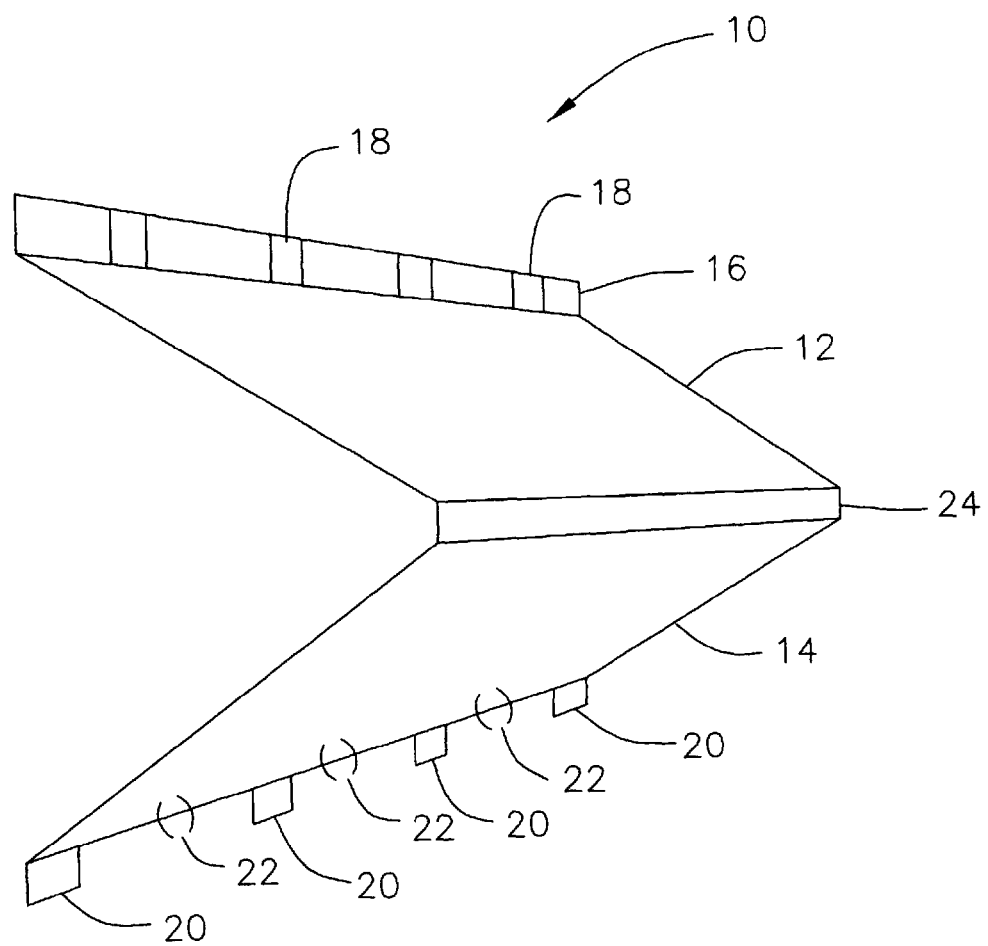
FIG. 3 shows a three dimensional depiction of a dual surface baffle in accordance with one embodiment of the present invention.

In one arrangement as shown in FIGS. 2 and 3, upper mounting flange 16 incorporates a series of integrally molded vent openings 18. Lower mounting flange 20 may also include a corresponding series of 2" wide vents 22 or similar openings at the bottom of baffle 10 allowing solid flow to enter and leave the interior of baffle 10 so as not to be trapped, and also provide a means of cleaning baffle 10, if necessary. when the clarifier is dewatered for annual maintenance.

Figure 5:
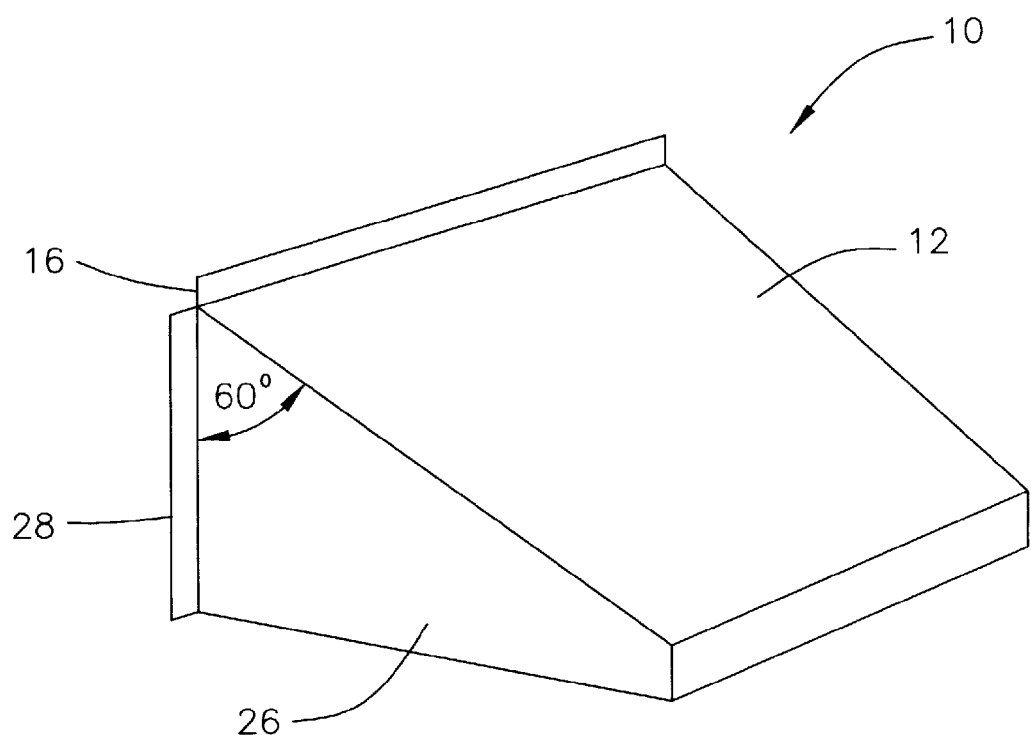
FIG. 5 shows a surface baffle with side bracket in accordance with one embodiment of the present invention.

As shown in FIG. 5, density baffle 10 is shown having upper baffle surface 12 which slopes downwardly and away from wall T (not shown) towards the center of the tank. Additionally, density baffle 10 is provided with an integrally molded side bracket 26 which provides support and rigidity for density baffle 10. As well, an integrally molded side bracket flange 28 is shown and is provided to maintain vertical support for side bracket 26 and upper baffle surface 12. In this way, when the plural baffles 10 are disposed in end to end relation about the peripheral tank wall, such that the second lateral end of the panel member of each baffle is secured to the end bracket of the next-adjacent baffle, whereby each end bracket 26 supports the baffle surface 12 of each set of two immediate-adjacent baffles on the peripheral wall as set forth in U.S. Pat. No. 5,252,205, the contents of which are incorporated herein by reference. Although FIG. 5 shows end bracket 26 integrally molded to baffle surface 12, it is to be understood that end bracket 26 may be separate and apart from baffle surface 12 and installed as a two piece assembly.

In one embodiment, as shown in FIG. 2, typically, the baffles are inclined at substantially 60 degrees measured from the vertical tank wall T. Such an arrangement. with the 60° inclination angles between upper and lower baffle surfaces 12 and 14 and wall T of the clarifier tank, offers improved baffle performance over the more common prior art 45° angle.

One additional advantage of the 60° angle arrangement shown in FIG. 2, with respect to prior art arrangements is that it results in a smaller vertical footprint on the tank wall while still achieving the desired horizontal projection into the tank. For example, the equation used to determine the desired horizontal projection depth of baffle 10 away from wall T into the tank is:

$$HP=18+a(D-30)$$

D=diameter of the tank in feet:
a=coefficient multiplier

For a long time, the "a" coefficient was set to 0.2 inches per foot which for a 100 foot diameter clarifier tank would set a desired horizontal baffle projection of approximately 32 inches. More recently, it has been suggested that an "a" coefficient of 0.3 inches per foot (or greater) be used resulting in a 39 inch horizontal projection.

With prior art density baffles set at 45° degree angles, this additional projection requires a significant amount of baffle material and cost as well as a larger tank wall footprint. The present invention, by setting the deflection angle of upper and lower baffle to 30° from horizontal (60° from the wall T), is able to achieve greater horizontal projection for all size tanks, such as substantially 39 inches for a 100 foot tank, less material and a smaller tank wall footprint, while still maintaining the desirable amount of protection from allowing solids to escape into the effluent. As shown in FIG. 2, horizontal projection h is noted as the distance between the tank wall and central plane 24.

In another embodiment, when the lower surface 14 is retrofitted to an existing baffle, it is likely that the upper surface 12 of such an existing baffle is longer and inclined at 45° degrees. In such an instance, a hybrid design may be utilized where the Lower surface 14 is inclined at 60° degrees from wall T and is of the length necessary to meet the existing baffle.

It is understood that the above identified angles for baffle surfaces 12 and 14 are exemplary only and are in no way intended to limit the scope of the application. Any substantially similar angles used with the conjoining dual surface baffle 10 are within the contemplation of this application.

In order to test the efficacy of dual surface baffle 10 described above, it has been tested under similar conditions to the prior art single surface (downward sloping) baffle designs. Exemplary computations were carried out with a commercial Computational Fluid Dynamics (CFD) program called FLOW.3DTM. Simulation testing of dual surface baffle 10 includes design testing against several different fluid motion equations including the transient, three-dimensional, Navier-Stokes equations [three equations], an equation of fluid continuity [—a condition of incompressibility], a two-equation turbulence model [two equations], and a drift-flux equation [—represent solids settling]. Such computations may use a structured, rectangular, mesh, and a Fractional Area/Volume Obstacle Representation (FAVOR) method to account for tank and baffle geometry.

The following descriptions of exemplary testing results showing the efficacy of dual surface baffle 10 versus prior art single surface baffles. In the tests, fluid was initially motionless in the clarifiers and steady flow conditions were modeled (i.e.. flow rates specified at the clarifier inlet and outlets were increased linearly from zero until the desired flow condition was achieved). In most cases, sediment solids concentrations associated with the steady-flow conditions were reported and used to evaluate the effectiveness of the different baffle designs.

Surface Overflow Rate (SOR) is a measure of the volume of input material and processed through the clarifier in a 24 hour period, divided by the surface area of the clarifier. For example, in the case of the 100 foot diameter clarifier, the surface area of the clarifier is 7854 square feet. If the SOR is 1300, the input to the clarifier is 10,200,000 gallons per day, commonly referred to as 10.2 MGD.

The following Table I shows the test results for the prior art baffle versus dual surface baffle 10 as described above. The test was set for 70 foot to 100 foot diameter clarifiers with the SOR fixed at 1300 gpdlft2 and with the distance between the blanket and the top of the sludge blanket also being fixed.

TABLE 1

Relative Effluent TSS, Stamford Baffle and Dual Surface Baffle

|  | 70 ft | 80 ft | 90 ft | 100 ft |
| --- | --- | --- | --- | --- |
| Stamford Baffle | .40 | .35 | .35 | .34 |
| Dual Surface Baffle | .66 | .70 | .72 | .80 |

Each entry in Table 1 is the ratio of the effluent TSS (Total Suspended Solid) concentration with no baffle to the effluent TSS concentration with the baffle. In the 70-foot clarifier, the prior art baffle reduced effluent TSS by 40% as compared to an unbaffled" control case. Under the same control conditions, baffle 10 reduced the TSS by 66%. The results for the Dual Surface Baffle show continued improvement as clarifier diameter increases.

Supporting the fact that these test results are applicable under working conditions. the test results for the prior art designs are substantially consistent with measurements obtained from actual installations.

Another issue with prior art baffles used in clarifier tanks is that they tend not to be effective in clarifiers operating at low flow because there are no density currents affecting flow. The formation and energy of density currents in a clarifier are largely dependent on the influent flow, the depth of the clarifier and the depth of the blanket. In the present instances, the simulated clarifier configurations employed SOR in the range of 400-600. the density currents lack sufficient energy to carry any lighter solids up the clarifier wall. Time-series flow' simulations show that these currents may reach the clarifier wall only to fall back on themselves without effecting TSS. As the flow increases, the density currents increase and blanket depth builds with a greater volume of unsettled solids at the top of the blanket. At this point the velocity of the density currents increases, they begin to transport lighter solids, and the density current baffles begin to function.

As shown in Tables 2 and 3, prior art baffles are compared against dual surface baffle 10 in simulated 70 foot clarifier and 100-foot claritiers across a range of surface overflow rates from 400 to 1300. The results for the two baffles were nearly identical through 700-800. Beyond that, their performance began to diverge as shown in both Tables 2 and 3.

Figure 6:
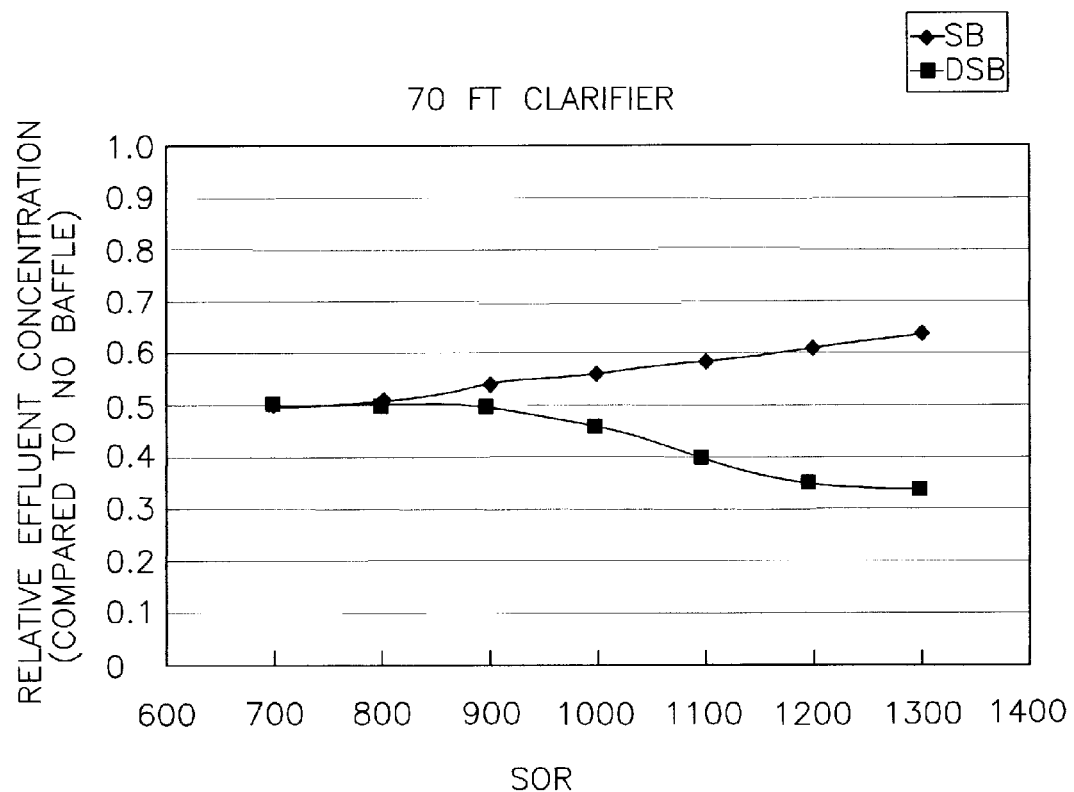
FIG. 6 is a relative effluent concentration comparison chart in accordance with one embodiment.

In the 70-foot diameter clarifier, shown in FIG. 6, the performance of the two baffles begins to diverge at about 800.

At that point, the test results suggest that the prior art baffles designs reduce 50% more solids than the no-baffle control case. As with the above test results, these results are consistent with measurements from installations that employ prior art baffles, lending veracity to the testing conditions.

As the overflow rate increases by nearly 100% to 1300, the performance of the prior art baffle drops by roughly 10%-15%. This suggests that the prior art baffle designs do not enable the clarifier to operate at higher flow and maintain TSS up to some limit. On the other hand, lending to the dual surface design of baffle 10, the performance remains constant at 50% through 900 and then actually increases to 65% at 1300, roughly the inverse of the prior art designs.

Figure 7:
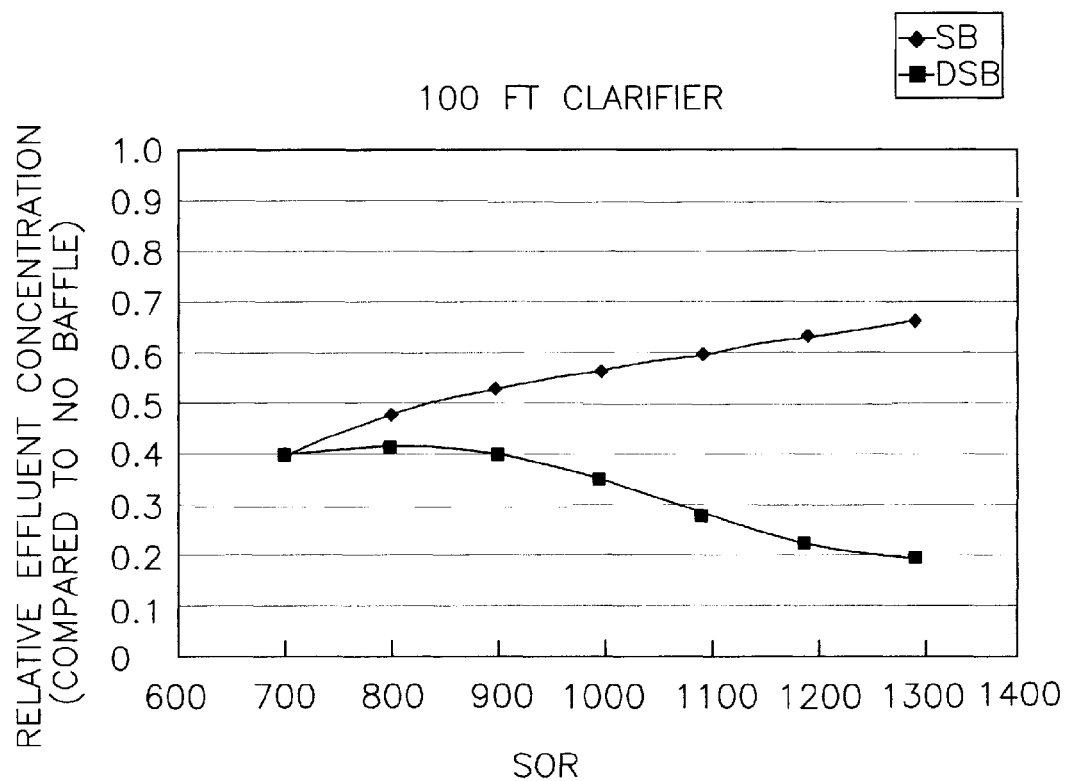
FIG. 7 is a relative effluent concentration comparison chart in accordance with one embodiment.

In the 100-foot clarifier shown in FIG. 7 both baffles function alike up to roughly 700, and then performance diverges rapidly. The prior art design performance follows a similar pattern to that of the 70-foot clarifier, decreasing with increased SOR and ending up at nearly the same level. On the other hand, the performance of dual surface baffle 10 continues to improve with increased SOR, particularly through the range of 900 to 1200.

It is noted that the baffle performance is sensitive to the distance between the baffle and the sludge blanket. In prior art arrangements the typical distance appears to be two feet from the bottom of the baffle to the top of the blanket. For the dual surface baffle 10, it is desirable to arrange it against tank wall T so that the blanket is at the low point of baffle 10.

The dual surface density baffle 10 offers significantly better performance than the prior art designs in larger tanks and treatment plant operations that are subject to high flows, including facilities with combined sewer configurations. The incorporation of baffle 10 enables treatment plants to treat significantly higher flows through the clarifier while maintaining allowable levels of TSS. The application of baffle 10 may eliminate the need for tertiary processing in some cases.

Figure 4:
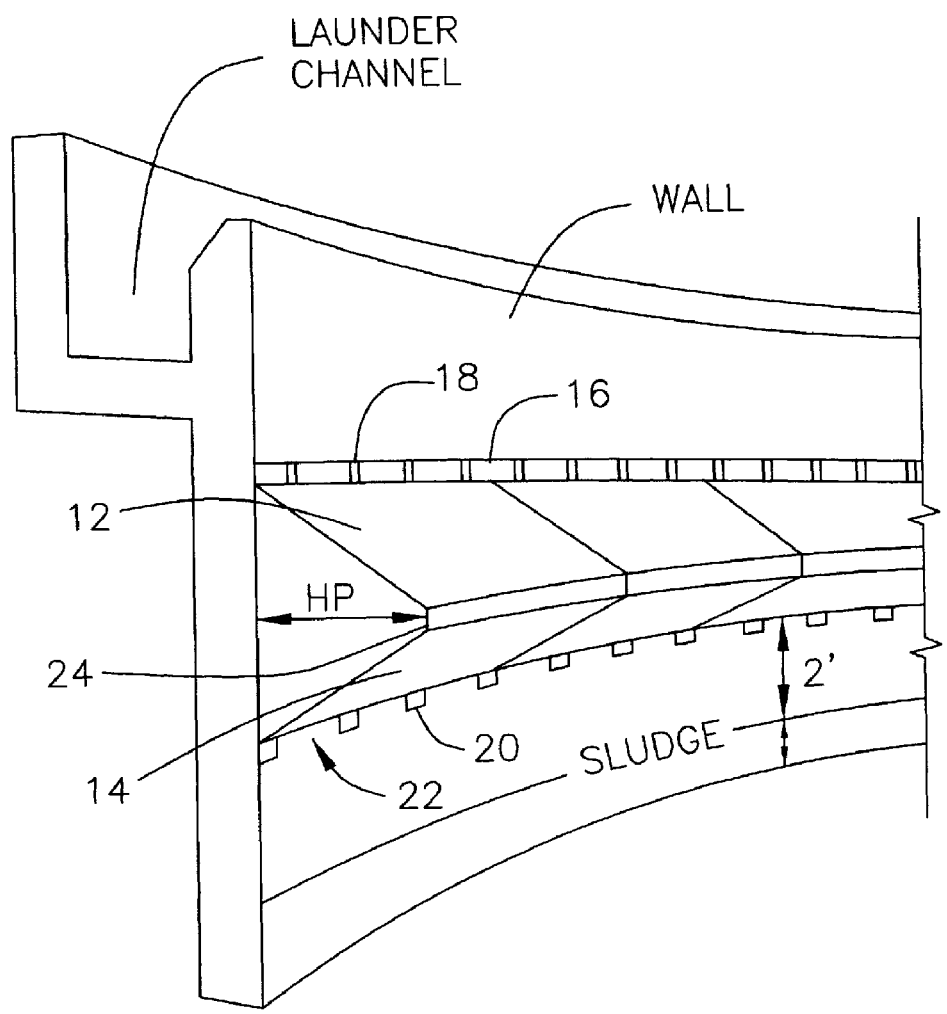
FIG. 4 shows a plurality of dual surface baffles in accordance with one embodiment of the present invention as each mounted on a clarified tank wall.

In one arrangement, as shown in FIG. 4, the performance of bathe 10 has been determined to depend, at least in part on distance between the bottom of the lower surface 14 (measured from where lower surface is connected to tank wall T) and the top of the sludge blanket. The sludge blanket refers to the settled solids accumulated at the bottom of the tank. This sludge blanket typically is between 1 and 6 feet deep (ie. from the bottom of the tank). For the purposes of illustration, the sludge blanket in FIG. 4 is set at 2 feet from the bottom of the tank.

In the arrangement of the present invention, baffle 10 is positioned substantially 2 feet from the top of the sludge blanket (ie. 4 feet from the bottom of the tank). It is understood that this measurement is exemplary, and that adjustments to this positioning of baffle 10 along the height of tank wall T are within the contemplation of this application.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A baffle system in a clarifier tank having a tank bottom and a periphery and a substantially vertical peripheral wall bounding the interior of the tank, said baffle system comprising:

a plurality of upper baffle surfaces, each mounted on the peripheral wall of the clarifier tank, said upper baffle surfaces each having a lower end and an upper end, the upper end of said upper baffle surfaces being coupled to the side wall of the clarifier tank wall, the lower end of said upper baffle surfaces being disposed at a substantially 60° angle away from the side wall of the clarifier tank such that said upper baffle surfaces each slope downwardly and away from the side wall forming a substantially continuous arrangement around the peripheral wall of the clarifier tank;

a plurality of lower baffle surfaces, each of which substantially correspond to a corresponding one of said plurality of upper baffle surfaces, said lower baffles surfaces each having a lower end and an upper end, the upper end of said lower baffle surfaces being coupled to the lower ends of substantially corresponding upper baffle surfaces, and with said lower ends of said lower baffle surfaces being disposed at a 60° angle to the side wall of the clarifier tank, such that said lower baffle surfaces slope upwardly and away from the side wall said combination of said upper baffle surfaces and said coupled lower baffle surfaces forming a substantially continuous dosed density current baffle around the peripheral wall of the clarifier tank.

2. The baffle system of claim 1, where the horizontal projection of said density current baffle into the center of the tank is determined using the following equation:

$$HP = 18 + a(D-30)$$

D=diameter of the tank in feet:
a=coefficient multiplier with the coefficient "a" is set to 0.3 inches per foot.

3. The baffle system of claim 2, wherein said has a diameter of tank of 100 ft diameter, resulting in a horizontal projection of 39 inches.

4. The baffle system of claim 1, wherein each of said upper and lower baffle surfaces, further comprise mounting flanges secured to the peripheral wall for securing said baffle surfaces to the peripheral wall of the clarifier tank.

5. The baffle system of claim 1, wherein each of said upper baffle surfaces further comprise vent openings integrally molded within said mounting flange.

6. The baffle system of claim 1, wherein each of said baffle surfaces are molded of a reinforced fiberglass composite.

7. The baffle system of claim 6, wherein each of said baffle surfaces is integrally molded of a reinforced fiberglass composite.

8. The baffle system of claim 7, wherein each of said baffle surfaces, further comprise mounting flanges secured to the peripheral wall for securing said baffle surfaces to the peripheral wall of the clarifier tank.

9. The baffle system of claim 1, wherein said density current baffle is positioned substantially 2 feet from the top of a sludge blanket of the tank, measured from where the bottom surface of said density current baffle is attached to the side wall of the tank.

10. The baffle system of claim 1, wherein said upper baffle surfaces further comprise an end bracket for supporting said upper baffle surfaces along a vertical axis on said tank wall.

11. The baffle system of claim 10, wherein said upper baffle surfaces and said end brackets are integrally molded.

12. The baffle system of claim 11, wherein each of said end brackets, further comprise mounting flanges secured along a vertical axis to the peripheral wall for securing said baffle surfaces to the peripheral wall of the clarifier tank.

* * * * *

UNITED STATES PATENT AND TRADEMARK OFFICE
CERTIFICATE OF CORRECTION

PATENT NO.           : 8,328,025 B2
APPLICATION NO.      : 13/028435
DATED                : December 11, 2012
INVENTOR(S)          : Earle Schaller and Elaine Schaller Page 1 of 1

It is certified that error appears in the above-identified patent and that said Letters Patent is hereby corrected as shown below:

Column 6, Claim 1 Line 20 - "dosed" should be "closed"

Signed and Sealed this
Nineteenth Day of March, 2013

Teresa Stanek Rea
*Acting Director of the United States Patent and Trademark Office*